March 14, 1950 H. C. HOOVER 2,500,826
TROLLEY UNDER RUNNER
Filed Aug. 10, 1945
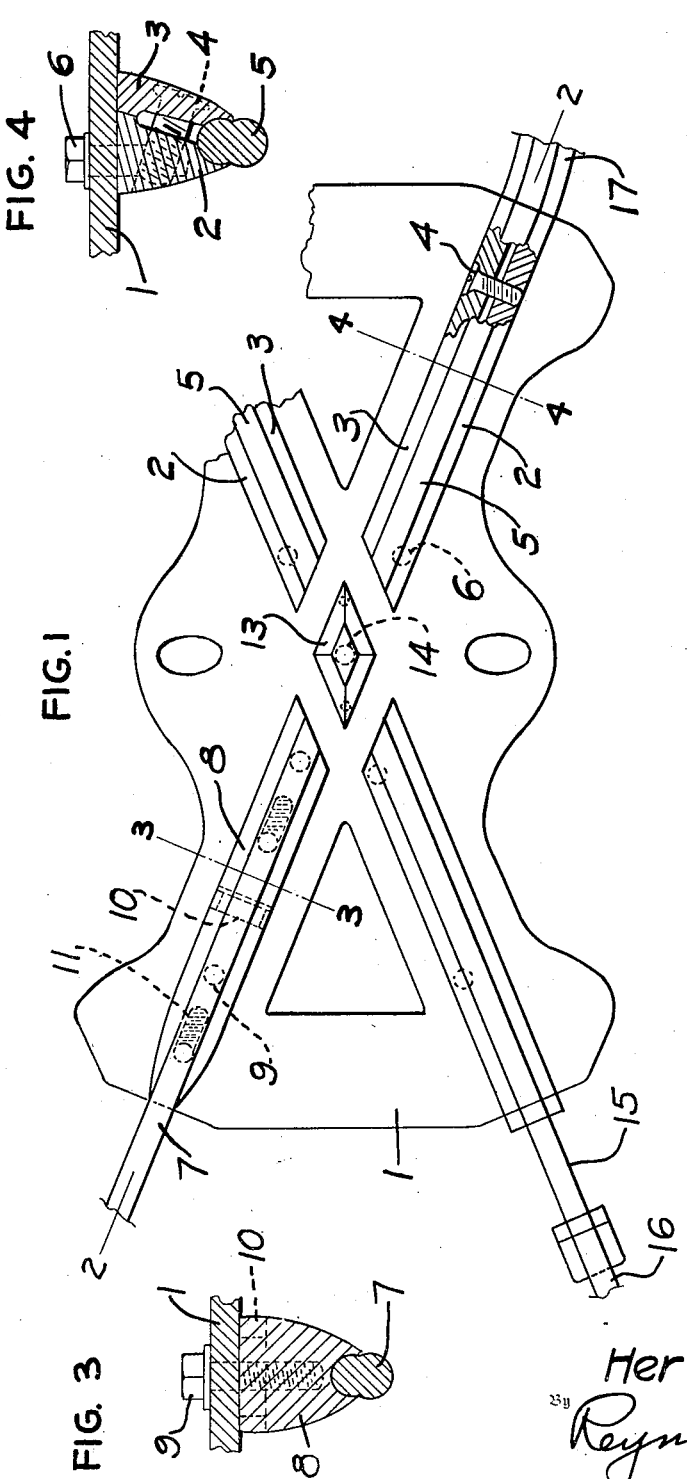
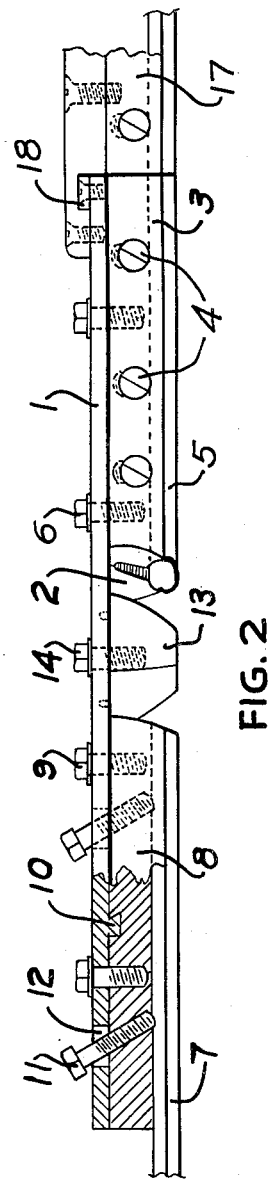
Inventor
Herbert C. Hoover
By Reynolds + Beach
Attorneys Patented Mar. 14, 1950

2,500,826

UNITED STATES PATENT OFFICE 2,500,826

TROLLEY UNDER RUNNER

Herbert C. Hoover, Seattle, Wash., assignor to The Ohio Brass Company, Mansfield, Ohio, a corporation of New Jersey Application August 10, 1945, Serial No. 609,969

5 Claims. (Cl. 191—37)

This invention relates to trolley wire installations, and more especially to devices such as junction fittings, such as for switches or for crossovers, and to the under runners used in such fittings.

It is common practice in such installations to support upon a permanently installed back plate at a proper location (such for instance as a crossover) a removable one-piece crossover plate, of bronze or like conductive material, formed with integral depending under runners or guides for the trolley shoe or wheel. Appreciable wear occurs at such location, usually at the inner side of the runners at a curve, and when such wear has occurred in one of the under runners, or in more than one thereof, as to affect normal operation, it is current practice to remove the entire cross-over plate from the back plate, and to replace it with a new cross-over plate. While this secures replacement of all the under runners at one time, it results also in very appreciable waste, for there may be considerably greater wear upon one under runner than upon another, but because of the wear of the one, the entire cross-over plate must be removed and scrapped.

On the other hand, in the shops of trolley systems there is at all times available a considerable amount of short lengths of trolley wire, quite suitable for use, as far as wear and conductivity are concerned, but unsuited for installation because of the shortness of their lengths. These short lengths, like the scrapped under runner or switch plates, constitute also an economic waste.

It is a primary object of the present invention to provide means for avoiding these two wastes, by providing shoe guiding elements or under runners, which preferably are individually replaceable and renewable when worn, but which in addition are provided with means for supporting and securing short lengths of trolley wire as the primary contact and wear elements, which themselves may be replaced and renewed when worn, to the end that the primary replacement need only be a short length of scrap trolley wire, and, at rare intervals, an individual under runner, but never an entire cross-over or switch plate.

It is, of course, a further object to provide such a fitting, having the advantages just indicated, which is also capable of incorporation in any normal trolley wire system. Thus, it is an object to provide such a fitting which will receive and dead-end a length of trolley wire led in from a distant support, and which wire therefore produces tension lengthwise of the wire, and to provide effective means for resisting such lengthwise pull, and of transferring it to the back plate, and yet which will permit ready disconnection of the trolley wire or of the under runner which carries it, when the need arises.

It is a further object to provide such fitting in which short lengths of trolley wire can be readily secured and removed for replacement when desired, which is provided with simple and convenient means for leading in trolley wires or other fittings, and which finally is of simple and economical construction.

With such objects in mind, my invention comprises the novel fitting and the novel under runners forming parts thereof, and their relative arrangement to one another, as shown in the accompanying drawings, described in this specification, and as will be more fully apparent from the appended claims.

In the accompanying drawings the invention is embodied in a crossover plate, to illustrate principles which may be applied also to other fittings, and in a form which is at present the preferred form.

Figure 1 is a bottom plan view, with parts broken away, of a typical cross-over fitting and connecting elements.

Figure 2 is a partial section through the back plate substantially along the line 2—2 of Figure 1.

Figure 3 is a cross section on the line 3—3 of Figure 1, illustrating the under runner which supports and resists the endwise tension in a trolley wire of indefinite length, thus supported, and Figure 4 is a similar section on the line 4—4 of Figure 1, illustrating a support for a short length of trolley wire.

As is customary, a back plate of steel, such as the back plate indicated at 1, is permanently supported at the proper location by suitable guy wires and the like. Its permanence is, of course, relative to the temporary or readily replaceable characteristics of the under runners. The supporting means have been omitted, and would be in any event conventional. While this back plate is charged and becomes a conductor of current, the under runners which it supports are of sufficient depth that this plate will never be contacted by the trolley shoe, for indeed, it is not properly shaped, being merely a flat plate. The herein proposed under runners are generally of triangular cross-section, with the apex downward, to support and guide the trolley shoe, whether that be in the form of a channeled shoe or of a trolley wheel. These under runners are supported from and depend below the back plate 1. The accompanying drawings show two such types of under runners, each incorporating the principles of this invention.

One such type is composed of the member 2 triangular in cross-section and the cooperating member 3, secured together by a screw 4, in such manner as to clamp, within a channel cooperatively formed at their lower edge, the upper lobe of a short length of trolley wire indicated at 5. The member 2 is supported from the back plate 1 by screw 6 and to accommodate the member 2 to a screw of proper size the member 2 is quite wide, and the member 3 is in turn supported from the member 2. The members 2 and 3 should be provided in rights and lefts, so that the member 3 may always be located at the side where most wear occurs. When worn, it may be necessary only to replace the member 3, which is most easily detachable, instead of the member 2, or both such members. Due to the cross-sectional shape of the runners and of member 2 and their width, the screw 4 is obliquely disposed to the axes of the screws 6.

The other type of under runner is best shown in Figure 3, and is intended for the securement of the dead end of a trolley wire of extended length. Such a trolley wire 7 is therefore of indefinite length, rather than being of a length coequal with the corresponding supporting under runner, as is the length 5.

The under runner or guide means which supports the end of the wire 7 is preferably formed in one piece, as indicated at 8, and is formed with a channel in its lower edge, within which the end of the wire 7 is inserted endwise and dead-ended. The under runner 8 is supported from the back plate 1 by screws 9. Since the wire 7 pulls endwise on the under runner 8, and the under runner 8 in turn pulls endwise on the back plate 1, this endwise pull is resisted, as between the under runner 8 and the back plate 9, by any suitable transverse interlocking integral arrangement as indicated at 10, and the endwise pull between the under runner 8 and the trolley wire 7 is resisted by set screws 11 passing freely through elongated apertures 12 in the back plate, and pinching into the wire 7 as its upper lobe lies within the channel in the runner 8, as is best shown at the left in Figure 2.

In a crossover, such as is shown in Figure 1, it is convenient to supply a center diamond 13, as a separate element, secured by the removable securing means indicated at 14 to the back plate 1. Whenever the diamond becomes worn it alone can be replaced.

Since the wire sections 5 are of a length corresponding only to the length of the supporting under runners or clamps 2, 3, means are provided, as is conventional, for leading the trolley shoe onto the back-plate-supported under runners. Thus, as shown at the lower left in Figure 1, an insulator 15 leads a trolley wire 16 onto the aligned under runner, and, as shown at the lower right in Figure 1, a curved runner 17 is similarly connected to the back plate. In such arrangements, as shown best in Figure 2, a conventional strain connection, as indicated at 18, may be employed.

The under runners 2, 3, or 8 are readily securable to the under side of the back plate, and provisions may be made for some slight transverse adjustment for proper alignment. They are of such depth that the trolley shoe can never contact the back plate. The trolley wire of indefinite length, such as 7, is pushed endwise into place, within the channel of the member 8, and secured by the inclined strain-resisting set screws 11. The short lengths 5, on the other hand, are cut from appropriate lengths of scrap trolley wire, and are then clamped into place between the parts 2, 3 of the under runner of this type. Here these short lengths of trolley wire function adequately to carry current to and to guide the trolley shoe, and to take the wear thereof. Whenever wear of such extent occurs that the shoe is no longer properly guided, it may be necessary only to remove the short lengths 5 and to substitute a new short length of scrap trolley wire, or to replace a member 3, or a complete under runner 2, 3, or 8. Should the wire 7 become worn, this may be replaced for such length as is necessary, for it would undoubtedly be worn elsewhere than merely within the length dead-ended at the under runner 8.

Vibration dampeners and similar devices may also be employed, as is customary, but such elements have been omitted, since they form no part of the present invention, and their inclusion would serve only to obscure the essentials of the present invention, as is set forth in the following claims.

The same principles may be incorporated in other fittings than the cross over shown. A switch fitting may be thus arranged, to guide a current collector crossing in either direction, and, in all instances, regardless of the angularity between the several under runners. Similar principles, as to individual under runners, may by incorporated in, for example, a curved runner for a single trolley shoe only.

All runners or guides on any single device would be according to that shown in Fig. 3 or that shown in Fig. 4. The two types of runners are shown in each Figs. 1 and 2 only for descriptive and illustrative purposes.

I claim as my invention:

1. In a trolley wire system, a permanently installed overhead supporting plate, an under runner formed for the support of a trolley wire by its upper lobe, means for removably securing the under runner to the lower surface of said plate, cooperating means formed integral with the plate and said under runner to resist lengthwise tension in the wire and prevent a shearing stress upon the first said means, the said cooperating means on both the supporting plate and the under-runner extending transversely of the runner and an inclined set screw received in the under runner and pinching the trolley wire supported thereby to resist the wire's tension, the plate having an elongated aperture for the free passage of said set screw.

2. A body member for a trolley device comprising a plate-like member adapted to receive along a face thereof a plurality of detachable guide members, means on the plate arranged to receive holding means to detachably secure the guide members in fixed position relative to the plate-like member, the plate-like member provided with openings through which may extend securing means without engaging the body member whereby a trolley wire may be secured in each guide member.

3. A body member for a trolley device comprising a plate-like member adapted to receive a plurality of renewable guide members, means on the plate adapted to receive holding means to secure the guide members to the plate member in fixed relation thereto, means formed integral with the plate adapted to interlock with transverse means on the guides to prevent a shearing stress upon the holding means therefor in a longitudinal direction, and securing means adapted to secure the trolley wire in the guide members after assembly of the guide members and the plate-like member, the plate-like member provided with openings for the free passage of the securing means.

4. An overhead trolley device comprising a body member, an under runner removably supported by and depending from the body member to guide a current collector but the runner not projecting longitudinally from the end of the body member, the runner provided with a transverse groove on its upper edge and having a second groove along its free edge to receive the end portion of a trolley wire, projecting means on the body member cooperating with the first said groove to prevent movement of the runner relative to the body member, securing means diagonally disposed to the longitudinal axis of the runner at a point between the center and end of the body member to engage and hold the trolley wire against longitudinal displacement, the said securing means and the runner provided with cooperating means whereby the said securing means may be moved into engagement with the trolley wire, and an opening in the body member through which the securing means extends free of the said body member.

5. In an overhead system, in combination, a plurality of trolley wires in a common plane with adjacent ends, the wires angularly spaced relative to each other, a crossing device arranged to receive the ends of the wires and hold them in predetermined relation, the said device comprising a permanently installed supporting member, a plurality of non-adjustable separately formed elongated guides of triangular cross-section, the wider face of each guide positioned against the lower face of the supporting member, each guide extending from but not projecting beyond the end of the supporting member to a point adjacent each other at the center of the supporting member, holding means extending through the supporting member and into adjacent openings in each guide to detachably secure the guides to the lower face of the supporting member, each guide provided with a groove along its free edge parallel to and spaced from the supporting member and in alignment with a trolley wire, a trolley wire positioned in each groove with the face of the wire projecting below the guide and exposed to be engaged by a passing current collector, means associated with each guide to secure the associated trolley wire in its groove, and separate means associated with the supporting member and with each guide where the guides contact the supporting member, the last said means extending transversely to the longitudinal axis of the guides and so interlocked with the means on the supporting member as to resist the shearing stress upon the holding means due to the longitudinal pull of the trolley wires.

HERBERT C. HOOVER.

REFERENCES CITED

The following references are of record in the file of this patent:

UNITED STATES PATENTS

| Number | Name | Date |
|---|---|---|
| 668,151 | Baron | Feb. 19, 1901 |
| 928,157 | Shissler | July 13, 1909 |
| 1,211,010 | Tighe | Jan. 2, 1917 |
| 1,711,883 | Forsyth | May 7, 1929 |
| 1,912,177 | Chandler | May 30, 1933 |
| 2,013,355 | Matthes | Sept. 3, 1935 |
| 2,187,310 | Genter | Jan. 16, 1940 |
| 2,288,681 | Chandler | July 7, 1942 |
| 2,304,763 | Matthes | Dec. 8, 1942 |

FOREIGN PATENTS

| Number | Country | Date |
|---|---|---|
| 238,466 | Germany | 1911 |
| 362,145 | Great Britain | Dec. 3, 1931 |
| 603,006 | France | Apr. 7, 1926 |